Patented Mar. 21, 1950

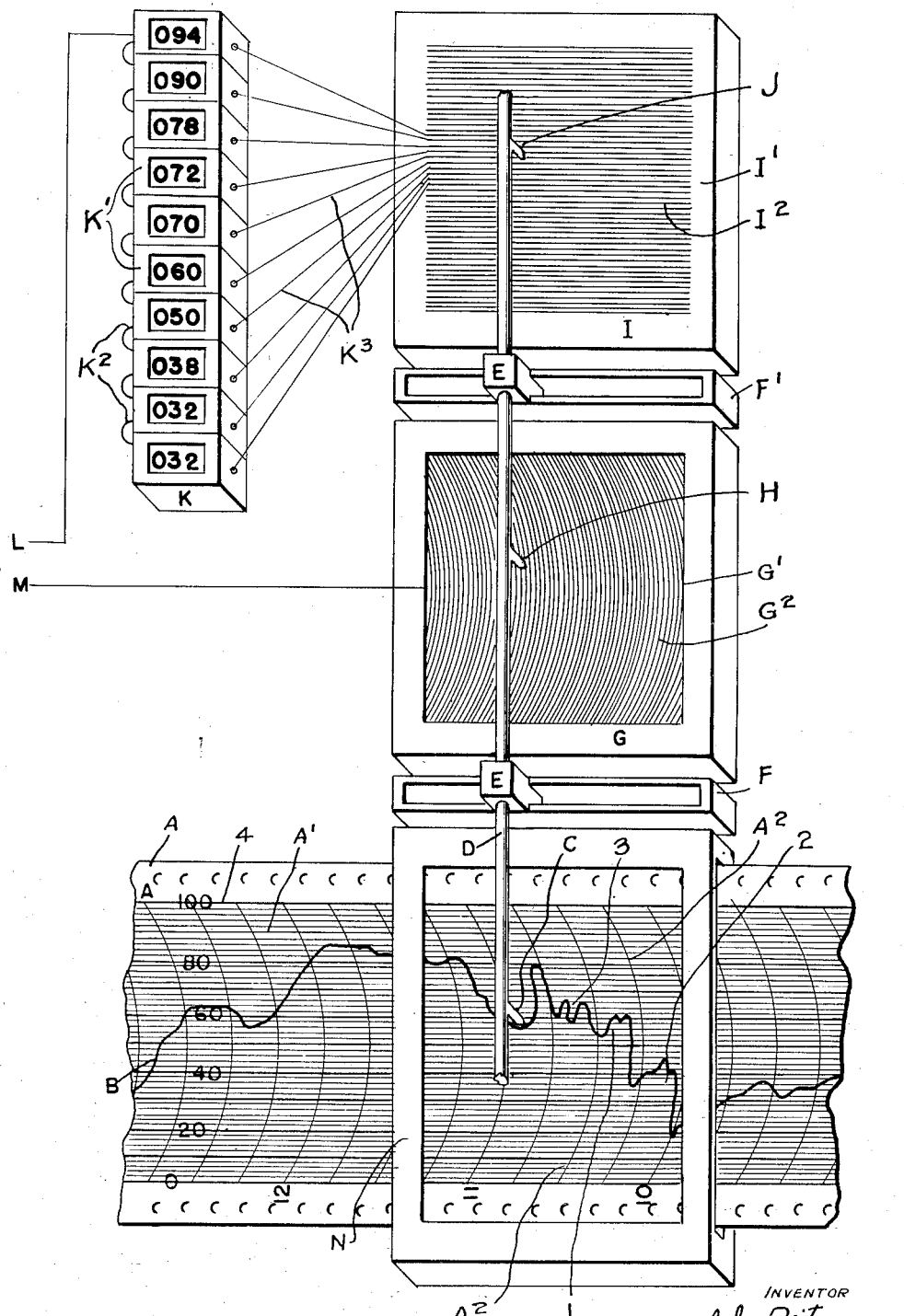

2,500,935

UNITED STATES PATENT OFFICE 2,500,935

CHART ANALYZER

Jules Deitz, Baltimore, Md.

Application February 6, 1948, Serial No. 6,571

5 Claims. (Cl. 235—92)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 stat. L. 467).

This invention relates to a novel arrangement for analyzing recorded charts rapidly, correctly and economically, when it is desired to evaluate a variable with respect to time or distance in terms of the percentage of unit time or distance that certain levels of the variation is reached or exceeded.

The drawing is a schematic illustration of one example of the apparatus showing its elementary parts.

In the example of the apparatus shown in the accompanying drawing, A indicates a continuous recorded chart of field strength versus time, the numerals 10, 11 and 12 on the chart indicating two time intervals of one hour on the chart.

In the example of chart shown in the drawing, there are arranged fifty closely and equally spaced horizontal lines A′ which are numerically indicated in groups of ten by numerals 0, 20, 40, 60, 80, 100, while in a time interval of one hour, as for instance from 10 to 11, there are 5 segmental lines $A^2$.

B indicates the curve which has been scribed upon the chart and which is to be analyzed.

On the chart line 57 indicated by the numeral 1 represents the value of signal reached or exceeded 50% of the time (½ hour) interval between 10 and 11 o'clock. Line 36 indicated by the numeral 2 represents the value of signal reached or exceeded 10% of the time (6 minutes), and line 66 indicated by the numeral 3 represents the value of signal reached or exceeded 90% of the time (54 minutes). As shown here, line 100 corresponds to zero signal. Percentage levels can be arrived at by adding up the segments of time a certain level is reached or exceeded and then calculating what percentage of unit time these segments represent. When attempting to make this analysis manually, it is necessary to cut and try when a particular percentage value is desired.

With this invention which will now be described, it is possible to arrive at an entire range of percentages in as little as 6 seconds.

The chart, A is slidingly held in a frame N, while directly above said frame are the time or distance increment commutator plate G and the level or amplitude increment commutator plate I. Intermediate the frame N and the plate G is a slotted guide F, while intermediate the plate G and plate I is a similar slotted guide F′. Plates G and I each include a sheet of non-conducting material G′ and I′ upon which are etched or printed conducting lines in patterns similar to the lines of the continuous recorded chart A. That is to say, the conducting lines $G^2$ of the plate G are equally spaced so that there are fifty lines to three inches which corresponds to a time period of one hour for the type of chart shown, the segmental curvature of the lines $G^2$ corresponding to the segmental curvature of the lines $A^2$ of the chart A.

Likewise, the conducting lines $I^2$ of plate I correspond to the lines A′ of chart A and the plate has 50 such lines equally spaced for a distance of 4½″ along the vertical and corresponding in spacing to the horizontal lines of chart A.

D indicates a vertical conducting rod which is vertically movable in the guide pieces E, which, in turn, are horizontally slideable in the slotted guides F and F′ so that the rod D is both vertically and horizontally movable over the chart A and the increment plates G and I.

Provided on rod D is a tracer point C which is caused to follow the chart curve B by manually moving the rod. Similarly, the contacts H and J on the rod D which are always in the same relative positions to the plates G and I as the tracer point C is to the chart A, are caused to move over the conducting lines $G^2$ and $I^2$ of the plates G and I.

Contact H on rod D is of the "break before make" type relative to the conducting lines $G^2$ and is of such dimensions relative to the thickness of a conducting line $G^2$, as will permit only one such conducting line of plate G to be contacted at one time, while contact J on rod D is of the "make before break" type relative to the conducting lines $I^2$ and is of such dimensions relative to the thickness of a conducting line $I^2$ plus the space between two of such horizontal lines as will assure contact with at least one conducting line $I^2$ of plate I.

K is an indicating device which is shown here as a plurality of fast acting commercially available electrically operated counters K′ all of which are capable of being electrically reset to zero simultaneously and indicate in steps of 2 from 0 to 100. These counters K′ are electrically connected in series as diagrammatically shown by the connecting links $K^2$.

It will be understood that as the tracer point C is made to trace over the curve B on chart A, contact H on the rod D contacts the conducting lines $G^2$ on the plate G and contact J on the rod D contacts the horizontal conducting lines $I^2$ on the plate I which correspond to the horizontal lines A' of the chart A being crossed or physically contacted by the tracer C in following the contour of the chart curve B of chart A.

Leading from the source of electrical power (not shown) is the conducting line M which leads to all the lines $G^2$ of the plate G so that they are all electrically connected together, and the conducting line L which leads to the uppermost counter K' of the bank K of counters.

While there are only ten electrical counters K' connected to ten horizontal conducting lines $I^2$ of the plate I by connecting wires $K^3$ shown in the drawing, it is to be understood that there is an electrical counter K' so connected to each conducting line $I^2$ of the plate I. All of such counters which are connected to horizontal conducting lines $I^2$ of plate I lying above the level of contact J are operated simultaneously as each conducting line $G^2$ of plate G is crossed by the contact H. It follows that all percent levels for the hour can be read directly from the counters after the chart curve B is traced over by the tracer C. With counters capable of operating 10/sec. a length of chart divided into 50 intervals can be traced as rapidly as 6 seconds. With fifty counters every percentage level can be obtained with great accuracy.

Percent levels for the hour can be read directly from the counters after the curves are traced. Thus "094" on the top counter shows directly that the horizontal conducting line to which that counter is connected was reached or exceeded 94 per cent of the period analyzed, usually one hour.

The system may include only ten counters with the circuit arranged so they could be plugged in to connect with any of the fifty horizontal conducting lines $I^2$ of the plate I.

The number of percentage levels available per tracing would be more or less limited and discretion would be exercised in deciding the best positions for the counters, the determining factors being the range of the variation of the chart curve being traced and the accuracy desired of the analysis.

Any type chart can be analyzed with an accuracy dependent on how close the conducting lines can be printed on plates G and I, it being understood that the size of said plates may be increased or decreased with relation to the size of the chart A if well known mechanical linkages are provided.

I claim:

1. A chart analyzer comprising a frame for displaying the chart; a pair of stationary electrical commutator plates, one of the plates having a series of insulated segments paralleling one coordinate of the chart and other plate having a series of interconnected segments paralleling the other coordinate of the chart; a slideable rod carrying in spaced relation a pair of electrical brushes, one for each commutator plate, and a tracer point for manually following the indication on the chart; a pair of carriages for supporting the rod and through which it may slide for moving the point over one coordinate of the chart; a pair of guides for supporting the carriages and over which they may slide for moving the point over the other coordinate of the chart; and a plurality of electrically operated counters individually connected to insulated segments of the first commutator plate and adapted to be operated by movement of the brushes over the commutator plates.

2. A device for analyzing a chart comprising a pair of stationary electrical commutator plates, one of the plates having a series of insulated segments paralleling one coordinate of the chart and the other plate having a series of interconnected segments paralleling the other coordinate of the chart, a pair of electrical brushes and means for moving them over the commutator plates in accordance with the indication on the chart being analyzed, and a plurality of electrically operated counters individually connected to the insulated segments of the first commutator plate and adapted to be operated by movement of the brushes over the commutator plates.

3. A device for analyzing a chart comprising a pair of electrical commutators, a series of electrical counters individually connected to segments of one of the commutators, a tracer point for following the indication on the chart, means for operating one of the commutators for selecting various ones of the counters in accordance with the movement of the point over one coordinate of the chart and means for operating the other commutator to actuate the selected counters in accordance with the movement of the point over the other coordinate of the chart.

4. A device for analyzing a chart comprising a bank of counters, a tracer point for following the indication of the chart, means for selecting various ones of the counters in accordance with the movement of the point over one coordinate of the chart and means for actuating the selected counters in accordance with a predetermined increment of movement over the other coordinate of the chart.

5. A device for analyzing a chart comprising a plurality of integrating devices, a tracer point for following the indication of the chart, means for selecting various ones of the integrating devices in accordance with the movement of the point over one coordinate of the chart and means for actuating the selected integrating devices in accordance with a predetermined increment of movement over the other coordinate of the chart.

JULES DEITZ.

REFERENCES CITED

The following references are of record in the file of this patent:

UNITED STATES PATENTS

| Number | Name | Date |
| --- | --- | --- |
| 1,503,824 | Fry | Aug. 5, 1924 |
| 1,903,418 | Jacobson | Apr. 11, 1933 |
| 2,212,799 | Sperry | Aug. 27, 1940 |
| 2,360,545 | Bond et al. | Oct. 17, 1944 |